Figure 1:
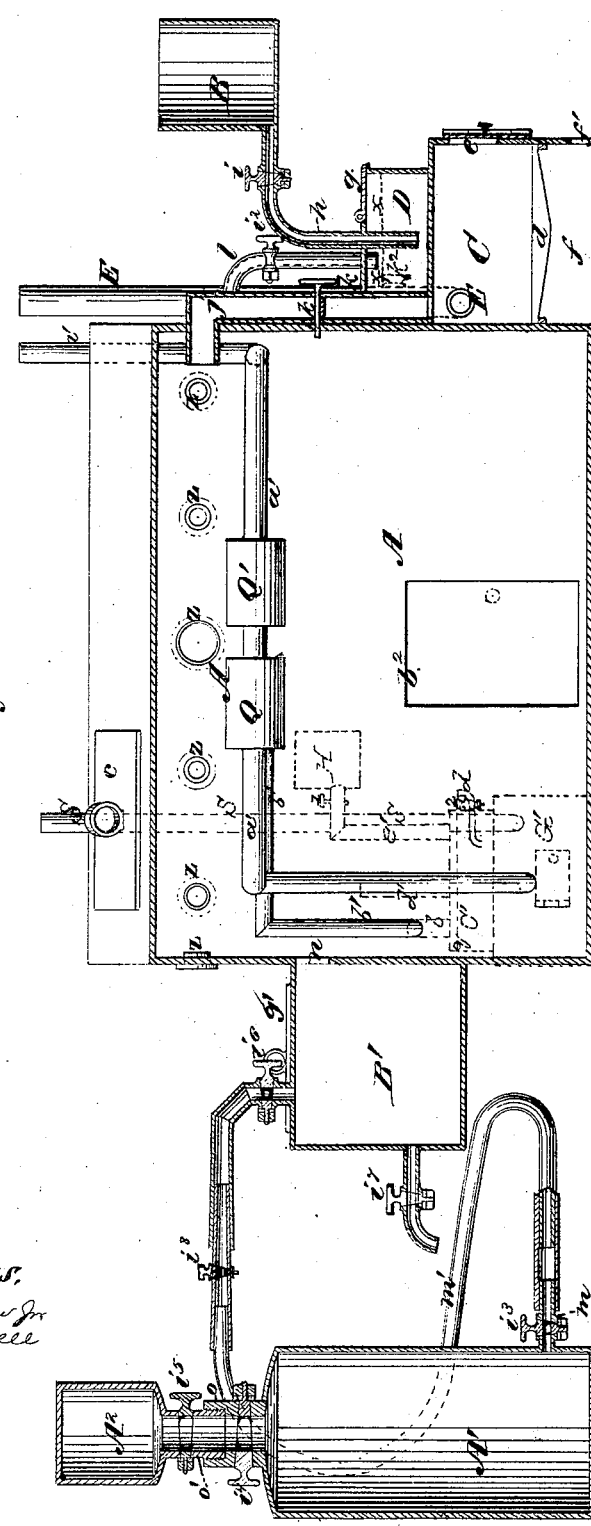

2 Sheets--Sheet 1.

J. L. ROWLAND.
Manufacture of Artificial Stone.

No. 153,020. Patented July 14, 1874.

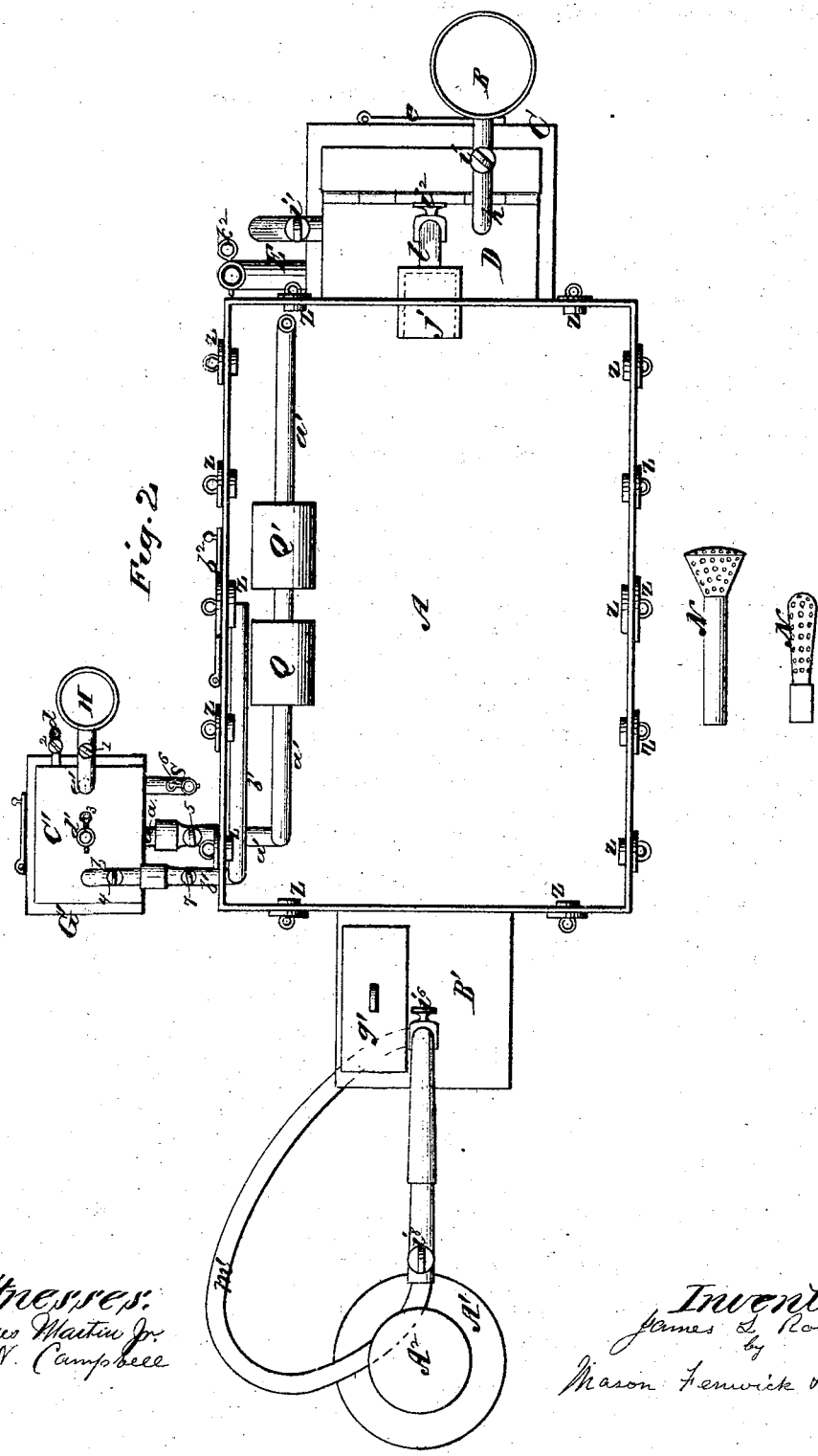

UNITED STATES PATENT OFFICE.

JAMES L. ROWLAND, OF NEW YORK, N. Y.

IMPROVEMENT IN THE MANUFACTURE OF ARTIFICIAL STONE.

Specification forming part of Letters Patent No. 153,020, dated July 14, 1874; application filed June 4, 1874.

*To all whom it may concern:*

Be it known that I, JAMES L. ROWLAND, late of Milwaukee, in the State of Wisconsin, but now of the city, county, and State of New York, have invented a new and Improved Process of Manufacturing Artificial Stone, of which the following is a specification, reference being had to the accompanying drawings, forming a part thereof, in which drawings like letters are used to signify the same parts of the apparatus which I employ to carry out my principle or modes of operation in the manufacture of such stone.

Figure 1 is a longitudinal vertical section of said apparatus, and Fig. 2 a plan view of the same.

My invention relates to a new and improved process in the manufacture of artificial stone, of indurating cements, or converting them into stone, by treating them with carbonic-acid gas, heat, and moisture, whether the cements be composed wholly or in part of a lime, either quicklime, hydraulic lime, or other form, or of hydraulic cement, or a magnesian cement, and whether two or more of these are combined with one another, or whether one or more are combined with other substances employed to form a cement, from which alone, or from which, when properly combined with sand or other equivalent or suitable substances or material, blocks or other articles are formed for use after being indurated or converted into stone.

My invention has for its object a more speedy and efficient induration or conversion into stone of blocks and other articles made from such cement, or such cement combined with other material or substances as may be suitable for the formation of the kind and quality of stone desired, than has heretofore been accomplished; and this I effect by a combination of processes, whether applied simultaneously or alternately during the act or indurating or converting into stone the cement or the blocks or other articles composed of it, of which it is an ingredient, as will be hereinafter described.

In the drawings, A indicates an indurating-chamber, in which blocks or other articles made of cement, or cement combined with other suitable material or substances, are placed, while in a green or partially dry state, for the purpose of being treated in order to indurate or convert such blocks or other articles into stone. This chamber is provided with an entrance-door, $b^2$, and an opening (or openings) is made in the roof, or in some upper portion of the chamber, having a cover, $c$, thereon, which can be wholly or partially withdrawn from the opening whenever it is desirable to allow heated or light air, nitrogen or vapors, to escape therefrom, thereby serving to regulate the chamber as to temperature and moisture. The chamber A should be made gas-and-vapor holding. Connected with the chamber, I construct a furnace, C, having at its bottom grate-bars $d$, a fuel-supply door, $e$, and ash-pit $f$, and draft-opening $f'$, for admission of air to promote combustion of charcoal or other carbonaceous fuel in the furnace. On top of this furnace I construct a vapor-generator, D, which is provided with a hinged lid, $g$, as shown. B is a water-tank, having a water-pipe, $h$, leading down into the vapor-generator, and terminating near the bottom thereof. This pipe is provided with a cock, $i$, for regulating the flow of the water from the tank into the vapor-generator, which generator is also provided with a cock, $i^1$, for drawing off and regulating the quantity of the water therein, as keeping it at the height shown in dotted lines marked $x\ x$, whereby nearly a constant quantity of vapor or steam of uniform temperature may be generated. A gas-flue, $j$, provided with a close-fitting regulating-valve, K, connects the gas-generator C with the indurating-chamber A, through which flue the gas as generated in generator C is conveyed into the indurating-chamber. A pipe, $l$, having a regulating-cock, $i^2$, is made to connect at its upper end with the gas-flue $j$, and at its lower end with the vapor-generator, through which the vapor (in regulated quantities, if desired) as generated is conveyed into this gas-flue. E is a pipe, provided with valve $K^2$, entering and leading from furnace C, as shown, for the passage of the gas and smoke when desired.

The operation of this apparatus is as follows: Water is supplied to the tank B, and from it the generator D is supplied. A fire is then built, with charcoal or other carbonaceous material, in the furnace C, which, being closed, the valve K opened, and the valve $K^2$ closed, compels the products of combustion and the carbonic-acid gas evolved to pass up the flue $j$. The fire, heating the water in the generator D, generates steam, or heated vapor, which escapes through the flue $l$, and, commingling with the gas from the furnace, the gas and vapor, in heated state, simultaneously pass into the indurating-chamber.

Connected also with the indurating-chamber A is an apparatus, of which $A^1$ is a water-carbonator charger, and consists of a strong water-and-gas tight vessel of about eight or ten or more gallons capacity, made, preferably, of copper, and provided at its lower end with a small tube, $m$, to which a hose-pipe, $m'$, may be attached, the tube $m$ being provided with a regulating stop-cock, $i^3$. This charger $A^1$ terminates at its upper end in a screw-threaded neck, $o$, through which is fitted a stop-cock, $i^4$.

$A^2$ is a smaller cylinder or vessel, preferably made of copper or lead, and of a capacity to hold eight or ten ounces of sulphuric acid, and has an elongated neck, $o^1$, constructed either so as to screw tightly into or around the neck $o$ of the charger $A^1$, as shown, the neck $o^1$ also being provided with a stop-cock, as at $i^5$, and so also the nozzle of the hose-pipe $m^1$ as at $i^8$. This charger or water carbonator $A^1$ is charged by supplying it with such proper quantities of sulphuric acid and soda dissolved in water as will evolve gas enough to give a pressure sufficient to force the solution or charge from the charger $A^1$ through the pipe $m$, when arranged therefor, into the box $B'$, the stop-cock $i^6$ being closed after the solution has entered said box.

A medium charge for a charger of the dimensions given above is one or one and a half pounds of bicarbonate of soda, about seven and a half gallons of water, and six or seven ounces of sulphuric acid. Larger quantities of the sulphuric acid and soda dissolved in water may be used when it is desired to speedily supply the indurating-chamber A, and in larger quantities, from the charger $A^1$.

The vessel $A^1$ is charged as follows: Remove the cylinder $A^2$, then put in the water and afterward the soda. This being done, pour the sulphuric acid into the cylinder $A^2$, and confine it therein by the stop-cock $i^5$, after which screw the cylinder $A^2$ into the charger $A^1$, as indicated in Fig. 1. After which, the cocks $i^4$ and $i^5$ being opened, the acid may be made to descend in regulated quantities, as desired, into the charger $A^1$, and therein mix with and act upon the soda in solution, which solution may now, under pressure of the gas evolved, be allowed to escape (in graduated quantities, if desired) through the cock $i^3$, hose $m'$, cock $i^8$, (in nozzle,) and cock $i^6$, down into the box $B^1$.

The solution, thus highly impregnated with chemically-generated carbonic-acid gas, will give off the gas from the box $B^1$ into the indurating-chamber A through the opening $n$, connecting said box and chamber; and the solution in the box $B'$, when having exhausted its gas, may be drawn off through the cock $i^7$, preparatory to another charge.

The box $B'$, instead of being charged with carbonated water, may, through its cover, $g'$, be supplied directly with a proper charge of sulphuric acid, water, and soda, or other solution for generating carbonic-acid gas, whence it (the gas) will escape directly as generated, through the opening $n$, as above described, into the chamber A. From the box $B'$ the gas enters the indurating-chamber in a moist cool state; while the gas evolved from the burning charcoal or other carbonaceous material used in the furnace C, enters the indurating-chamber in a moistened but heated state.

By the use of the cock $i^2$ and the valve $k$, more or less of heated gas, and more or less of steam or heated vapor, may be made to enter the chamber A, and either alternately or simultaneously, in connection or combination with chemically-generated gas from the box $B'$ or the charger $A^1$, be utilized to indurate the materials or articles placed in said chamber for conversion into stone. Or, by opening the valve $k$ and lid $g$, and shutting the valve $k^2$ and the cock $i^2$, heated gas from the furnace C, without the heated vapor or steam, may be used as desired, in connection or combination with the chemically-prepared gas, generated either in the vessel $A^1$ or in the box $B'$. In other words, by the apparatus shown in said Figs. 1 and 2, the cement or materials or articles to be converted into stone, or indurated, may be treated for a time, as desirable, by heated carbonic-acid gas alone, as generated from the burning coal, prior to being treated with one or more charges of the chemically-prepared gas; during the operation of which the valve $k$ is opened, the valve $k^2$ closed, and the lid $g$ opened to let the vapor escape, the cock $i^6$ being closed, and there being no charge or solution left in the box $B'$; or treated for a time with heated gas in connection with heated vapor or steam, prior to being treated with one or more charges of the chemically-prepared gas; and to do this, the cock $i^2$ and valve $k$ are opened, the valve $k^2$ closed, and no charge made from the box $B'$; and then treated with one or more charges from the box $B'$. Or the cement or material or articles to be converted into stone, or indurated, may be simultaneously treated with heated gas, in combination with steam or heated vapor and moistened chemically-generated carbonic-acid gas from the vessel $A^1$ or the box $B'$, the same being effected by opening the cock $i^2$ and valve $k$ and closing the valve $k^2$ and supplying a charge to the box $B'$. Or the cement or material or articles to be indurated or converted into stone may be simultaneously treated (as desired) with heated vapor or steam in combination with the chemically-generated carbonic-acid gas and without the heated carbonic-acid gas, the chemically-generated gas being, in this case, warmed or heated, as desired, by the heated vapor or steam alone, to do which the cock $i^2$ is opened, the valve $k$ closed, valve $k^2$ opened, and a charge from the vessel $A^1$ let into the box $B'$, or the box $B'$ otherwise charged, as hereinbefore explained. Or the cement, or material, or articles may be first treated, for a time, with chemically-generated carbonic-acid gas alone, (without either heated vapor, or steam, or heated gas,) to do which the valve $k$ is closed, the valve $k^2$ opened, the cock $i^2$ closed and lid $g$ opened, and a carbonic-acid solution supplied to the box $B'$ from the vessel $A^1$, or otherwise, as hereinbefore stated. Then, by introducing into the indurating-chamber heated vapor or steam, or heated carbonic-acid gas, or both, the chemically-generated gas previously introduced may thereby be warmed or heated as, or to such degree as, desired.

It will be seen from the above that, for the induration or conversion into stone of blocks or other articles made of cement, or cement combined with other material or substances and placed in the chamber A, I am enabled to utilize carbonic-acid gas which is generated from vegetable matter, as by burning carbon or carbonaceous material in a grate or furnace, and carbonic-acid gas generated by the chemical action of an acid on a proper base, in solution or in combination with water, the former being applied in a heated and the latter in a cool state. And, further, that these gases may be separately or unitedly applied, as alternately or simultaneously, in connection with moisture, and that, while this is being done, the degree of heat, quantity of moisture, as well as the volume of gas employed, may be regulated as desirable, according to the nature of the varying kinds or qualities of the cement used in the manufacture of the blocks or other articles under treatment and conditions essential in this treatment to their rapid and efficient induration or conversion into stone.

I will here state that where the chamber A is charged or supplied with heated or unheated gas and moisture (moisture in the form of finely-divided particles of water, as vapor or steam, being greatly preferred) the gas is held in suspension, as it were, by the moisture, and thus both are made to permeate the cement or material under treatment by absorption, the gas being absorbed with the moisture; or, in other words, the water or moisture is made to serve as a carrier of the gas to the cement or matter with which it enters into chemical combination, the element, water, or moisture in this case, serving as a means of effecting this chemical union, as without the intervention of water or moisture carbonic-acid gas does not enter into chemical combinations with any of the metallic oxides; and when heat is employed, in combination with the gas and water or moisture, in charging or operating the chamber A, the moisture is made also in like manner to serve as a carrier of it (heat) simultaneously with the gas to the cement or matter with which the gas enters into a chemical combination, the heat in this case expediting or facilitating the chemical combination.

When, in the treatment of material or articles placed in the chamber A to be indurated or converted into stone, it is desired to operate this chamber with a more copious supply of moisture than is furnished by the above-described modes, or with a wetter chemically-generated gas, I use as auxiliary to, or in combination with the modes above described, the following mode, to wit: I introduce, through suitable openings made at varying points in this chamber A, (some of such openings being shown in Figs. 1 and 2, and lettered $z$,) carbonated water or a charge—one or more, as desirable—from the carbonated-water charger $A^1$, in the form of fine spray or mist, directly into the chamber instead of into the box $B'$, and directly to the material or articles placed therein for treatment or otherwise, as desired. In this case, in making the application of carbonated water, I use a nozzle closed at its end and suitably pierced with many fine holes, (nozzle represented in Fig. 2 by letter N,) or a nozzle in the shape of, or having fitted to the end of it, a rose pierced with fine holes, in connection with the pipe $m'$, (nozzle with rose represented in Fig. 2 by letter $N'$,) in order that the carbonated water, on being forced through these holes, may be diffused as mist or vapor into all portions of this chamber A, and the material or articles under treatment be thus enveloped in an atmosphere or bath of wet carbonated vapors or wet gas.

Water may be used in supplying this chamber, or the material under treatment therein, with moisture, if desirable, but not with the same efficient result as by attaching hose $m$ to another hose or a pipe carrying water under pressure, and then introducing it same as the carbonated water.

From the description above given of the apparatus placed at either end of the chamber A in Figs. 1 and 2, and the statement set forth of the manner in which they are used in conjunction with or auxiliary to each other, either alternately or simultaneously, it will be understood that the functions of each in operating this chamber are as follows: Of that at the right, to furnish this chamber either with a cool and moist carbonic-acid gas or carbonic-acid gas in solution, as carbonated water; of that at the left, to furnish this chamber with vapor of water and carbonic-acid gas in a warm or heated state; or, in other words, to supply this chamber either with heat and carbonic-acid gas in combination, or with heat and vapor or moisture, or heat, vapor, or moisture, and carbonic-acid gas, in combination; and it will be also understood that the chamber A is operated by these apparatus, used alternately or simultaneously with each other, as the nature of the cements or material (or its condition) under treatment, some kinds requiring more or less than others of heat and moisture in combination with the gas for its speedy and efficient induration or conversion into stone—in other words, operated by regulating it as to temperature and moisture with a view of supplying the requisite conditions for effecting a speedy chemical combination of the carbonic-acid gas with the material under treatment.

In operating or regulating the indurating-chamber as to temperature and moisture by these modes, gases and vapors of different temperatures are made to commingle therein, and thereby the usual phenomena which occur in nature by the meeting and commingling of vapors and atmospheric air of different temperatures and conditions as to moisture are produced within this chamber, except that the rain or dew in this case is thoroughly impregnated or charged with carbonic-acid gas.

From explanations hereinbefore given of the functions of the apparatus placed at either end of the chamber A, and of the different modes of operating them, it will be understood that, in regulating this chamber as to temperature and moisture when operated with these apparatus, its temperature may be elevated from a lower to a higher, or reduced from a higher to a lower, degree, as desired, as by introducing the heated gas or heated vapor or steam, or both, from the apparatus at the left of the chamber for a time, the temperature of this chamber is elevated, and, on the other hand, by introducing the cool gas or carbonated water, one or both, from the apparatus at the right for a time, the temperature is lowered or reduced; and also that its temperature may be elevated from a lower to a higher degree, or reduced from a higher to a lower degree, or vice versa, and alternately, if desired, as by introducing into this chamber from the apparatus at the right cool gas or carbonated water, or both, for a time, then shutting off or not the cool gas (and carbonated vapor, if used) from the chamber, and introducing from the apparatus at the left heated gas or heated vapor or steam, or both, or, vice versa, introducing the heated gas or heated vapor, or both, and then the cool gas and carbonated water, if desired, or either; and, furthermore, that its temperature may be kept at a constant or fixed degree, or nearly so, by using both apparatus simultaneously in conjunction with each other and with the proper management, as by running steadily the apparatus with which heated gas and heated vapor are generated, and supplying the chamber with these, one or both, and at the same time supplying it with the chemically-generated gas in constant and regulated quantities by means of the stop-cocks $i^3$, $i^3$, and $i^6$, through which this gas is allowed to escape into the box B'.

Usually this chamber is operated by running the apparatus at the left steadily during the day in one way by keeping the valve $k$ in the gas-flue $j$ and the cock in the vapor-pipe $l$ open and the valve $k^2$ closed, whereby the heat and vapors and gas in quantities as generated are furnished steadily to the chamber, and by charging the box B' once, twice, or more times, as desired, during the day, either directly with a proper charge or solution of bicarbonate of soda, water, and sulphuric acid, or with charges from the charger $A^1$; when with charges from the charger $A^1$, by graduating the charge in its passage to the box B', as hereinbefore stated.

For the reason that other apparatus and other forms of or modifications of the forms of the apparatus shown in Figs. 1 and 2, and hereinbefore described in illustrating the principle and different modes of operating this my invention, may be made to serve the same purpose, and used to effect the same objects or results as those hereinbefore described and shown in Figs. 1 and 2, I desire it to be understood that I do not confine myself to the specific apparatus or the precise forms of the apparatus shown in Figs. 1 and 2, and hereinbefore described, in operating or carrying out my invention, as, for example, in operating the chamber A, the chemically-generated carbonic-acid gas, after being introduced or generated therein, may be warmed or heated; so, also, carbonated water when used, and vapor generated from it, and also from the water in the chamber, or in the material under treatment, (the vapor in these cases becoming carbonated,) by several of the ordinary means of heating or warming rooms or apartments, but not in my experience with the same degree of success and economy; or this carbonic-acid gas, after being generated within the chamber A, or introduced therein, may be warmed or heated, and also moisture supplied, by introducing and discharging directly in this chamber, or generating therein, heated vapors or steam, whatever the apparatus used for generating the vapors or steam therein, or generating and introducing them therein, as, when convenient, steam generated and conducted in a suitable pipe or pipes from the boiler of a steam-engine, and discharged in proper quantities directly into the chamber A, will serve this purpose; and in this case the steam employed, if desired, may have its temperature regulated in its passage to and previously to being discharged into the chamber in various ways, as by the length or form of the pipe, as a coil, one or more, through which it is conducted to the chamber; or by conducting the steam from the boiler first into a small steam-tight box or chamber of a cubic foot or more capacity placed between the boiler and the chamber A, and thence from this box into the chamber A; or by submerging or enveloping the pipe through which it is conducted to the chamber A between the boiler and this chamber, in whole or in part, in a cooling medium, as water; or steam or heated vapor generated and conducted from a proper boiler or vessel connected with an ordinary stove or furnace, and discharged into the chamber A in proper quantities, will serve this purpose; so also the heat generated in such stove or furnace may be introduced into this chamber A by conducting it into the chamber in a proper pipe for radiating it, and be utilized for this purpose. In this case the products of the combustion in the stove or furnace, with which the heat is generated in combination, are not discharged in this chamber as the steam in the aforesaid case, but are conducted in a pipe through and out of the chamber, the heat escaping in the chamber by radiation in its passage.

The apparatus shown in front of the chamber A, Figs. 1 and 2, represents such ordinary stove or furnace provided with a boiler, and such other parts and arrangements as render it suitable to serve the purposes hereinbefore stated in operating the chamber A, and is so constructed as to be connected to or disconnected from the chamber A at will, and, therefore, used when desired. Connected by joining the pipes $a$ and $b$, which enter and lead, respectively, from the stove and boiler, as shown, with the pipes $a'\, a'\, a'$ and $b^1\, b^1$, which pipes are, respectively, shown within the chamber A, Fig. 2, and disconnected by detaching said pipes, and consists of parts which may be described as follows: G' is an ordinary stove or furnace; C', a boiler for generating heated vapor or steam, and set in said furnace, as shown. H is a water-tank, from which this boiler is supplied with water through the pipe $e'$, which is provided with a stop-cock, 1. $d$ is a small pipe of the form shown, entering and leading out of the boiler C', provided with a stop-cock, 2, which is an outlet for any excess of water supplied to this boiler; and by the stop-cocks 1 and 2 the water in the boiler C' may be kept at the height shown in dotted line $q$, or nearly so, and thereby a more constant quantity of vapor or steam of uniform temperature be generated; $d'$, a small pipe entering the boiler C', provided with a stop-cock, 3, and is used as an outlet for steam or vapor from the boiler, when so desired. $b$ is a pipe entering the boiler C', and leading in the direction shown, in order to connect with the pipes $b^1\, b^1$, and is for conducting the heated vapor or steam into the said pipes $b^1\, b^1$, through which the vapor or steam is conducted and discharged into the chamber A. Said pipe $b$ is provided with a valve, 4, for regulating in quantity the steam or vapor in its passage to the pipe $b^1\, b^1$ or chamber A, and also for shutting off the steam or vapor from the chamber, when it is desired to do so. $a$ is a pipe entering the furnace G', and leading in the direction shown, in order to connect with the pipe $a'\, a'\, a'$, and is for conducting the heat generated in the furnace G' into said pipe $a'\, a'\, a'$; whence it radiates into the chamber A, and has a valve, 5, as shown, for regulating it as admitted into the pipe $a'\, a'\, a'$, and also for shutting it off from this pipe $a'\, a'\, a'$ on the chamber A, whenever it is desired to do so. The pipe $a'\, a'\, a'$ enters the chamber A, takes the directions, and passes through and out of it, as shown, and is enlarged at the points Q and Q', as shown, for the purpose of radiating a greater quantity of heat. The pipe $b^1\, b^1$, provided with a valve, 7, also enters the chamber A, takes the directions as shown, and passes to a point about midway between the enlarged portions of the pipe $a'\, a'\, a'$, where it discharges the heated vapor or steam directly into this chamber. S is a pipe entering into and leading out of the furnace G', taking the directions shown, provided with a valve, 6, and is for the passage of the products of combustion from the furnace through it when they are shut off from, and not conducted into, the pipe $a'\, a'\, a'$ or chamber A. The apparatus is operated as follows:

Connect the apparatus with the chamber A, and open the valve 7 in pipe $b^1$, which is closed only when this apparatus is disconnected from this chamber, and build a fire in the furnace G'. This fire may be made of wood or coal of any sort, as there is no discharge of the smoke or other products of combustion within the chamber, the heat being radiated by the pipe $a'\, a'\, a'$. Supply the boiler C' with water from the tank H, and adjust the cocks 1 and 2 for graduating thereafter the flowing in and out of water. The outflow from the boiler may be graduated to a very small stream or frequent drops, and the flow-in graduated in accordance with such an outflow; then, if it be desired to use heated vapor or steam, open the valve 4 and 6, and close the stop-cock 3 and valve 5, and the heated vapor or steam as generated will be conducted by the pipes $b$ and $b^1\, b^1$ into and discharged within the chamber A, the heat generated in the furnace passing out of the pipe S, it being cut off from the chamber by closing the valve 5 in pipe $a$. If it be desired to use the heat alone from the furnace G', instead of the heated vapor or steam from the boiler C', close the valves 4 and 6, and open the valve 5 and the stop-cock 3, and the heat as generated in the furnace G' will pass into the pipe $a'\, a'\, a'$, and thence radiate into the chamber A, the steam or heated vapor in this case escaping through the pipe $d'$, it (the steam) being wholly cut off from the pipe $b^1\, b^1$ or the chamber A. If it be desired to use both the heat and the heated vapor or steam in combination, either alternately or simultaneously, this is done as follows: Simultaneously, by introducing within the chamber A, as above described, at the same time both the heated vapor or steam from the boiler C' and the heat from the furnace G'. Alternately, by introducing within the chamber A, as above set forth, the heated vapor or steam from the boiler C' for a time, then shutting it off from the pipe $b^1$ $b^1$, allowing it to escape through the pipe $d'$, and introducing the heat from the furnace $G'$ for a time, then shutting it off from the pipe $a'$ $a'$ $a'$, allowing it to pass through S, and introducing the heated vapor or steam again, thus alternating in the use of the heat and steam, or vice versa, first introducing the heat for a time, and when shut off as above described, then introducing the heated vapor or steam.

From the above it will be understood that this apparatus is used either for generating and discharging heated vapor or steam directly into the indurating-chamber A, or for introducing heat alone or both, either alternately or simultaneously therein, for warming or heating the chemically-generated carbonic-acid gas introduced or generated therein, and also the carbonated water when introduced, as above set forth, while the chamber A is being operated with the apparatus shown at the right of it in Fig. 1, it being used in connection with the apparatus shown at the right of chamber A, Fig. 1, instead of the apparatus shown at the left of this chamber, and for the same purpose as that, except that with this apparatus no heated carbonic-acid gas is supplied to the chamber, as no arrangement is provided therefor in it.

It may also be used for the same purposes, as above set forth, in connection with and auxiliary to the apparatus shown at the left of the chamber A, Fig. 1, when that apparatus and the one shown at the right of the chamber are used in conjunction, as heretofore set forth.

And from the description hereinbefore given of this apparatus and the modes of operating it, it will be understood that by means of the valve 4 the heated vapor or steam from the boiler $C'$ may, in its admission to the chamber A, be graduated as to volume or quantity; and so, also, by the valve 5, the heat from the furnace $G'$ may, in its admission to this chamber, be graduated as to quantity. And, furthermore, that, however operated when supplying this chamber A with heat from the furnace $G'$, only the heat of the products of combustion within the furnace escapes in this chamber.

In the construction of the indurating-chamber A, as stated substantially in the specification of my Letters Patent No. 109,669, and dated November 29, 1870, no peculiar form or mode or kind of material is requisite, further than that the chamber is made of gas and vapor holding material and convenient for receiving the stone or other articles for treatment, and if intended to be removable so constructed in its parts as to be easily put up or arranged to receive its blocks or other articles; or, in the case the blocks or other articles are to be first arranged and the chamber to be then placed over them, so constructed in its parts as to be easily placed over, or over and around them, and easily taken down and apart or removed after the material, blocks, or other articles have become indurated or converted into stone.

It will be seen from the aforegoing description that my invention may be employed for treating cement, or cement in combination with other substances or material, in the manufacture of artificial stone, as follows, to wit: First, by the combination and application or employment, either alternately or simultaneously, within the indurating-chamber, of carbonic-acid gases of different temperatures, and generated by different processes, as carbonic-acid gas generated chemically by the chemical action of an acid on a proper base in solution, or combination with water, which is a cool gas, and carbonic-acid gas generated from vegetable matter by burning such matter—as, for example, charcoal or coke in a suitable grate, furnace, or other vessel, which is a warm or heated gas; second, by the combination and application or employment, either alternately or simultaneously, within the indurating-chamber, of carbonic-acid gases of different temperatures and generated by different processes—as carbonic-acid gas generated chemically, or carbonic-acid gas generated from vegetable matter, as aforesaid, the former being a cool and the latter a warm or heated gas, and vapor of water and steam; third, by the combination and application or employment, either alternately or simultaneously, within the indurating-chamber, of carbonic-acid gases of different temperatures and generated by different processes, as carbonic-acid gas generated chemically and carbonic gas generated from vegetable matter, as aforesaid, the former being a cool and the latter a warm or heated gas, and carbonated water; fourth, by the combination and application or employment, either alternately or simultaneously, within the indurating-chamber, of carbonic-acid gases of different temperatures and generated by different processes, as carbonic-acid gas generated chemically and carbonic-acid gas generated from vegetable matter, as aforesaid, the former being a cool and the latter a warm or heated gas, vapors of water, or steam, and carbonated water; fifth, by the combination and application or employment, within the indurating-chamber, of carbonic acid gas generated chemically, as aforesaid, and heated vapor of water or steam; sixth, by the combination and application or employment, either alternately or simultaneously, within the indurating-chamber, of carbonic-acid gas—whether the gas be generated chemically or from vegetable matter, as aforesaid, and heated vapor of water or steam and carbonated water; seventh, by the combination and application or employment, within the indurating-chamber, of either carbonated water or carbonic-acid gas, generated chemically as aforesaid, or both, and either heat alone or heat in combination with heated vapor of water or steam, or heated carbonic-acid gas, or both; eighth, by the regulation, for the purposes and in the various ways described, of the indurating-chamber; ninth, by the combination of an indurating-chamber and an apparatus (one or more) for generating and conveying into this chamber either carbonic-acid gas chemically generated, as aforesaid, or carbonated water, one or both, and an apparatus (one or more) for generating and conveying into this chamber, either alternately or simultaneously, with the aforesaid gas or carbonated water, or both, warm or heated carbonic-acid gas, generated as aforesaid, or heated vapor of water or steam, or both; and also an apparatus, one or more, that may be connected to this chamber and disconnected at will, and used or operated for the purpose and as before described, however these apparatus may be located in respect to this chamber or each other, in the treatment of the material or articles in the manufacture of the stone.

I do not claim, nor do I intend hereafter to claim, under this application, the invention of applying carbonic-acid gas, generated by the action of an acid on mineral matter in solution or combination with water, or this gas, together with carbonated water within the indurating-chamber, to materials placed therein for treatment; or any apparatus herein shown and described for generating, preparing, and making an application of such gas, or such gas together with carbonated water to materials within said chamber, as the invention of such application and drawings representing such apparatus for such application may be found set forth and described in my Letters Patent, No. 149,682, dated April 14, 1874. Nor do I claim the invention under this application of applying to materials within the indurating-chamber carbonic-acid gas generated by the combustion of vegetable matter in connection or combination with moisture, as vapors of water or steam, or water introduced into this chamber through a rose pierced with many fine holes, in the form of mist or spray, or otherwise introduced, or carbonated water, or any combinations within said chamber of such gas and moisture, or water, either in the form of finely-divided particles, as vapor or spray, or its usual form, or carbonated water, or carbonated vapors, *per se*, as the same may be found set forth in my Letters Patent, No. 109,669, No. 128,980, and No. 137,322, and dated, respectively, November 29, 1870, July 16, 1872, and April 1, 1873.

Having described my invention, what I claim as new, and desire to secure by Letters Patent, is—

1. The mode of indurating artificial stone made of cement or concrete within the indurating-chamber by the introduction of carbonic-acid gases of different temperatures, introduced into said chamber either simultaneously or alternately, one of said gases being generated from mineral, the other from vegetable matter, as aforesaid—the former being introduced in a cool and the latter in a warm or heated state, in the manner set forth.

2. The mode of indurating artificial stone within the indurating-chamber by the introduction of carbonic-acid gases, one generated from mineral and the other from vegetable matter, of different temperatures, within said chamber, simultaneously or alternately, together with vapors of water (or steam) or carbonated water, or both, and applied to cement or concrete, as and for the purpose set forth.

3. The mode of combining within the indurating-chamber carbonic-acid gas (generated chemically, as aforesaid) and carbonated water and heated vapor of water applied to cement or concrete, as a means of effecting a speedy and efficient induration of the same.

4. The combination of carbonic-acid gas generated by the chemical action of an acid on a proper base in solution with water and carbonic-acid gas generated by combustion of vegetable matter, the two gases being introduced alternately or simultaneously within the indurating-chamber, and commingled with watery vapor or with carbonated water, or with both, and applied to cement or concrete, as and for the purpose set forth.

5. The combination of an indurating chamber, A, with an apparatus, A', for generating carbonic-acid gas by chemical re-agents; an apparatus, C, for generating carbonic-acid gas from the combustion of vegetable matter, and mingling the same with steam, the said generator being provided with pipes J $l$, by which these vapors may be introduced either separately or commingled into the indurating-chamber, as and for the purpose described.

6. In combination with the indurating-chamber A, the detachable heater, consisting of the fire-box G', boiler C', and pipes $a$ $b$, by which heated currents may be carried into the drums Q Q', or discharged directly within the chamber through the pipe $b^1$ $b^1$, as and for the purpose described.

7. The simultaneous introduction within the indurating-chamber of carbonic-acid gases of different temperatures, generated either from vegetable or mineral matter, as described.

JAMES L. ROWLAND.

Witnesses:
J. N. CAMPBELL,
JAMES MARTIN, Jr.